US007054765B2

(12) United States Patent
Flaemig et al.

(10) Patent No.: US 7,054,765 B2

(45) Date of Patent: May 30, 2006

(54) MEASURING TRANSDUCER

(75) Inventors: Hartmut Flaemig, Stutensee (DE); Andreas Muhr, Linkenheim-Hochstetten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/836,400

(22) Filed: May 3, 2004

(65) Prior Publication Data

US 2005/0017736 A1 Jan. 27, 2005

Related U.S. Application Data

(63) Continuation of application No. PCT/DE02/04072, filed on Oct. 31, 2002.

(30) Foreign Application Priority Data

Nov. 2, 2001 (DE) ................................ 101 53 997

(51) Int. Cl.
*G01F 1/00* (2006.01)

(52) U.S. Cl. ........................ 702/47; 702/127; 702/189; 73/1.59

(58) Field of Classification Search .................. 702/47, 702/127, 189; 73/1.59
See application file for complete search history.

(56) References Cited

U.S. PATENT DOCUMENTS

| | | | | |
|---|---|---|---|---|
| 4,581,707 | A * | 4/1986 | Millar | 702/47 |
| 4,799,169 | A * | 1/1989 | Mims | 702/47 |
| 4,825,685 | A * | 5/1989 | Breimesser | 73/727 |
| 5,142,483 | A * | 8/1992 | Basham et al. | 702/47 |
| 5,874,895 | A | 2/1999 | Devarney | |
| 5,925,835 | A * | 7/1999 | Solanki et al. | 73/865.9 |
| 6,278,389 | B1 * | 8/2001 | Lochmann et al. | 341/118 |
| 2005/0002794 | A1 * | 1/2005 | Beller et al. | 417/44.2 |

FOREIGN PATENT DOCUMENTS

| | | | |
|---|---|---|---|
| DE | 197 57 196 | A1 | 6/1999 |
| DE | 299 17 651 | U1 | 12/2000 |
| DE | 100 53 188 | A1 | 3/2001 |
| DE | 100 63 996 | A1 | 6/2001 |

OTHER PUBLICATIONS

A.H. Taner, J.E. Brignell, "Aspects of Intelligent Sensor Reconfiguration", Elsevier Science S.A., Sensors and Actuators, A 46-47, pp. 525-529, 1995, UK.

Helmut Raab, "Ausfallinformation Bei Digitalen Meβumformern Mit Analogem Ausgangs-Signal: Vereinheitlichung Des Signalepegels", ATP—Automatisierungstechnische Praxis, vol. 36, No. 7, pp. 30-32, 34-35, Jul. 1994, Munich, Germany, abstract considered.

* cited by examiner

*Primary Examiner*—Marc S. Hoff
*Assistant Examiner*—Janet L Robbins
(74) *Attorney, Agent, or Firm*—Sughrue Mion, PLLC

(57) ABSTRACT

A measuring transducer having a sensor (2) transforming a measured parameter, recorded by the sensor, into an electrical sensor signal (3), a signal processing unit (6), adapted to convert the sensor signal into a measurement signal (7) and to generate an error message signal (11), and a data interface (8) transmitting the measured signal and the error report signal. In order to enable error events external to the measuring transducer (1) to be recorded in a simple manner, the measuring transducer includes a control input (15) other than the data interface (8). This control input is adapted to transmit an error report signal (11) that is generated.

9 Claims, 1 Drawing Sheet

1 Measuring Transducer
2 Sensor
4 Diaphragm Seal
6 Signal Processing Unit
8 Data Interface

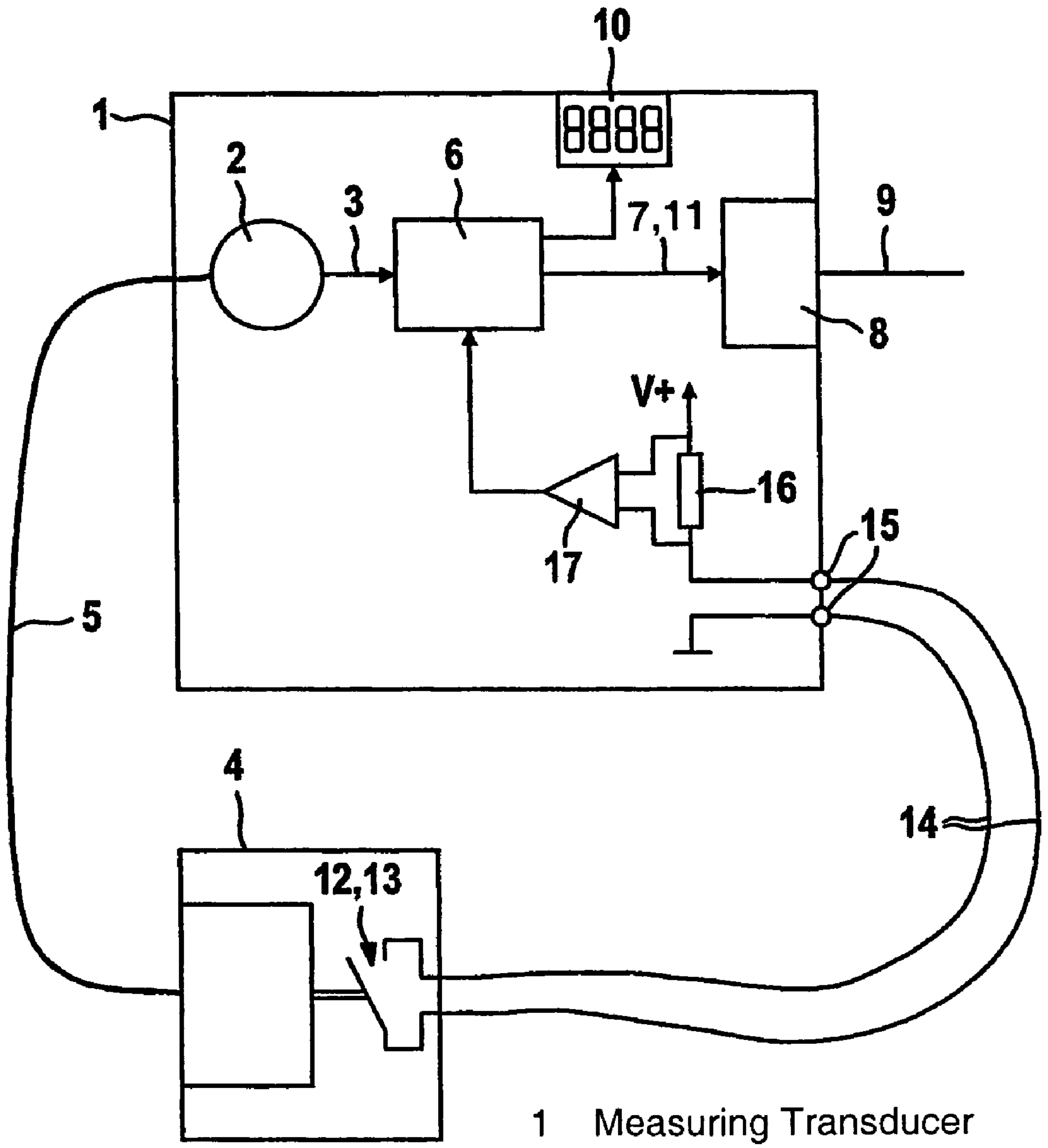
1 Measuring Transducer
2 Sensor
4 Diaphragm Seal
6 Signal Processing Unit
8 Data Interface

MEASURING TRANSDUCER

This is a Continuation of International Application PCT/DE02/04072, with an international filing date of Oct. 31, 2002, which was published under PCT Article 21(2) in German, and the disclosure of which is incorporated into this application by reference.

FIELD OF AND BACKGROUND OF THE INVENTION

The invention relates to a measuring transducer with a sensor for converting a measured quantity detected therewith into an electrical sensor signal. More particularly, the invention relates to such a measuring transducer with a signal processing unit adapted to preprocess the sensor signal into a measuring signal and to generate an error message signal, and with a data interface for transmitting the measuring signal and the error message signal.

A pressure transducer, for example, has a pressure sensor whose sensor signal is amplified, digitized, analyzed and corrected for linearity and temperature response in a transducer-internal signal processing unit. The measuring signal thus preprocessed is fed via a data interface, e.g. PROFIBUS or HART, to the communication system of a technical installation in which the transducer is installed. Any hardware or software errors occurring in the measuring transducer are indicated on the measuring transducer. In addition, the error is provided as digital diagnostic information at the data interface. In a 4 . . . 20 mA interface, the error can also be transmitted in analog form as a current value outside this predefined signal level range in accordance with NAMUR Recommendation NE43, e.g., as a downscale value of <3.6 mA or an upscale value of >21 mA.

OBJECTS OF THE INVENTION

One object of the invention is to provide a simple way to signal also those error events that occur outside the measuring transducer.

SUMMARY OF THE INVENTION

According to one formulation of the invention, this and other objects are attained by providing the measuring transducer of the initially described type with a control input which differs from the data interface and which is used to trigger the generating of the error message signal. Thus, for an error event detected outside the measuring transducer, the control input of the measuring transducer is used to cause the transducer to generate an error message signal and to transmit it via the data interface.

The error message signal is preferably generated by short-circuiting the control input, so that no control signal needs to be generated. As an alternative, a current path in the control input can be interrupted to generate the error message signal.

The measuring transducer is preferably operated with an add-on device equipped with a monitoring unit, which monitors its functional state and is connected to the control input of the measuring transducer. If the functional state of the add-on device changes, in particular, in the event of a functional failure, the measuring transducer generates the associated error message signal.

The monitoring device preferably has a switch actuated by a change in the functional state. This switch can be a pressure switch, a temperature switch, a magneto-inductive switch or another type of switch that responds when a pressure, temperature, position or other limit is exceeded or fallen short of.

In particular, the add-on device can be a diaphragm seal, such that the monitoring device detects any loss of transfer medium in the diaphragm seal.

BRIEF DESCRIPTION OF THE DRAWINGS

The invention will now be described in greater detail with reference to the drawing FIGURE, which depicts an embodiment of the measuring transducer according to the invention.

DETAILED DESCRIPTION OF THE PREFERRED EMBODIMENTS

A measuring transducer 1, in this case preferably a pressure or differential pressure transducer, has a sensor 2 with which a measured quantity, in this case pressure, is converted into an electrical sensor signal 3. For this purpose, the pressure is detected at a measuring point in a technical installation using a diaphragm seal 4 and is transmitted to the sensor 2 via a transfer medium in a capillary 5. In a signal processing unit 6 the sensor signal 3 is preprocessed into a measuring signal 7 and is subsequently supplied to the communication system 9 of the technical installation via a data interface 8. The signal processing unit 6 is further adapted to detect any hardware or software errors occurring in the measuring transducer, to indicate these errors with the aid of a display 10 on the measuring transducer and, in addition, to make the error available as diagnostic information 11 at the data interface 8.

The diaphragm seal 4 has a monitoring device 12 with a pressure switch 13, which responds and closes in the event of a loss of transfer medium. The pressure switch 13 is connected to a separate control input 15 of the measuring transducer 1 via a two-wire control line 14. One connection of the control input 15 is connected to the ground potential and the other connection to the supply voltage potential V+ of the measuring transducer 1 via a resistor 16, such that a current flows through the resistor 16 when the pressure switch 13 closes. The resulting voltage drop over the resistor 16 controls a comparator 17—in the simplest case an AND gate—which triggers the signal processing unit 6 to generate the error message signal 11. Alternatively, the pressure switch 13 can also operate as a normally closed contact, such that the current path in the control input 15 is not closed but opened for the error message.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A measuring transducer comprising:

a sensor configured to convert a measured quantity into an electrical sensor signal;

a signal processing unit configured to process the sensor signal into a measuring signal and to generate an error message signal for an error occurring in said measuring transducer;

a data interface for transmitting the measuring signal and the error message signal; and a control input distinct from the data interface and configured to trigger the signal processing unit to generate the error message signal for an error event detected outside said measuring transducer.

2. The measuring transducer as claimed in claim 1, wherein a short-circuiting of the control input triggers the signal processing unit to generate the error message signal.

3. The measuring transducer as claimed in claim 1, wherein an opening of a current path in the control input triggers the signal processing unit to generate the error message signal.

4. The measuring transducer as claimed in claim 1, wherein the control input is configured with a connection for operation with an add-on device equipped with a monitoring device to monitor a functional state of the add-on device.

5. The measuring transducer as claimed in claim 4, wherein the monitoring device has a switch actuated by a change in the functional state of the add-on device.

6. The measuring transducer as claimed in claim 4, wherein the add-on device comprises a diaphragm seal, and wherein the monitoring device detects a loss of transfer medium in the diaphragm seal as a change in the functional state.

7. An apparatus, comprising:

a measuring transducer having a sensor outputting an electrical sensor signal, a signal processor processing the electrical sensor signal into a measurement signal and to generate an error message signal for an error occurring in the measuring transducer, a data interface outputting the measurement signal and the error message signal, and a control input distinct from the data interface and configured to trigger the signal processing unit to generate the error message signal for an error detected outside the measuring transducer; and a device external to the measuring transducer outputting a status signal to the measuring transducer;

wherein the measuring transducer further comprises a component outputting a further signal to the signal processor in accordance with the status signal, and wherein the signal processor outputs a generated signal in accordance with the further signal.

8. The apparatus according to claim 7, wherein the external device comprises a diaphragm seal, and the status signal is indicative of an operational parameter for the diaphragm seal.

9. The apparatus according to claim 7, wherein the component is arranged on a signal path between the external device and the signal processor, and is coupled to a dedicated input of the measuring transducer separate from the sensor and the data interface.

* * * * *